United States Patent
Barriga et al.

(10) Patent No.: US 8,572,708 B2
(45) Date of Patent: Oct. 29, 2013

(54) METHOD AND ARRANGEMENT FOR INTEGRATION OF DIFFERENT AUTHENTICATION INFRASTRUCTURES

(75) Inventors: Luis Barriga, Johanneshov (SE); David Castellanos Zamora, Madrid (ES)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 923 days.

(21) Appl. No.: 12/521,493

(22) PCT Filed: Dec. 28, 2006

(86) PCT No.: PCT/SE2006/050631
§ 371 (c)(1),
(2), (4) Date: Jul. 3, 2009

(87) PCT Pub. No.: WO2008/082337
PCT Pub. Date: Jul. 10, 2008

(65) Prior Publication Data
US 2010/0115598 A1  May 6, 2010

(51) Int. Cl.
*H04L 29/06* (2006.01)

(52) U.S. Cl.
USPC ............ 726/8; 726/2; 726/6; 726/10; 726/12; 713/168; 713/170; 380/229; 380/232

(58) Field of Classification Search
USPC ............... 726/2, 4, 8, 10, 12; 713/168, 170; 380/229, 232
See application file for complete search history.

(56) References Cited

U.S. PATENT DOCUMENTS

| | | | |
|---|---|---|---|
| 8,069,435 B1* | 11/2011 | Lai .................................. | 717/106 |
| 2003/0189720 A1* | 10/2003 | Bei et al. ...................... | 358/1.15 |
| 2004/0230811 A1* | 11/2004 | Siegel et al. ................... | 713/186 |
| 2005/0154886 A1* | 7/2005 | Birk et al. ...................... | 713/168 |
| 2006/0080352 A1* | 4/2006 | Boubez et al. ................. | 707/102 |
| 2007/0130286 A1* | 6/2007 | Hopmann et al. ............. | 709/217 |
| 2007/0234417 A1* | 10/2007 | Blakley, III et al. ............ | 726/12 |
| 2008/0016195 A1* | 1/2008 | Tulshibagwale et al. ..... | 709/223 |
| 2009/0119754 A1* | 5/2009 | Schubert ............................ | 726/4 |
| 2011/0197209 A1* | 8/2011 | Walsh et al. .................. | 719/330 |

* cited by examiner

Primary Examiner — Saleh Najjar
Assistant Examiner — Joseph Pan

(57) ABSTRACT

A method that provides efficient integration of infrastructure for federated single sign on (e.g. Liberty ID-FP framework) and generic bootstrapping architecture (e.g. 3GPP GAA/GBA architecture) uses an integrated proxy server (IAP). The IAP is inserted in the path between a user and a service provider (SP). The IAP differentiates type of access and determines corresponding operative state to act as a liberty enabled server or as a GAA/GBA network application function. A Bootstrapping, Identity, Authentication and Session Management arrangement (BIAS) leverages on 3GPP GAA/GBA infrastructure to provide an integrated system for handling Liberty Federated SSO and 3GPP GAA/GBA bootstrapping procedures at the same time. This method and arrangement provides improved use of infrastructure elements and performance for authenticated service access.

21 Claims, 6 Drawing Sheets

METHOD AND ARRANGEMENT FOR INTEGRATION OF DIFFERENT AUTHENTICATION INFRASTRUCTURES

TECHNICAL FIELD

The invention generally relates to authentication of users attempting to access services provided in a communications network. In particular the invention relates to authentication in networks integrating different infrastructures for service access.

BACKGROUND

In a telecommunications system a user has to authenticate for access to the telecommunications network using some method for network authentication. 3GPP has standardized an Authentication and Key agreement Architecture (AKA) wherein user equipment (UE) and network functionality shares a common key as basis for the authentication. The key is managed at the time for subscription to network services preferably stored on a security card, e.g. a SIM card.

Furthermore, a user requesting access to a network service has to authenticate again with the service e.g. to establish a basis for charging. It is common in the art to base trust between a service provider and an end user on sharing security keys. Thus, there is a considerable problem in the management of such keys which will hamper the development and offering of new services.

In order to remedy the key management problem, 3GPP has been developing a Generic Bootstrapping Architecture, (GBA). Basically, the network authentication method is reused in a bootstrapping procedure to create a generic key as basis for generation of further keys related to network services. Therefore, a Network Application Function (NAF), implementing network services and belonging to a specific operator network, may communicate with a network "Bootstrapping Server Function" (BSF) to receive a session key related to the NAF entity. User equipment UE, implementing the same method for authentication as the network, may derive the same generic key and there from derive the same session key.

Thus, the bootstrapping procedure, e.g. GBA bootstrapping, offers a convenient key management that may be used in relation to services offered by a network operator. In the remaining of this document such services will be referred to as internal services. The domain of the key management procedure described above may be extended to incorporate different network operator domains by establishing an inter trust model making it possible for a roaming user UE to establish shared key with a network service in a roaming network.

GBA describes the security features and a mechanism to bootstrap authentication and key agreement for application security from the 3GPP AKA mechanism (3GPP TS 33.220 Generic Bootstrapping Architecture). The GBA architecture enables distribution of shared secrets to both user equipment UE and Network Application Functions NAF. GBA implies modification of certain network entities like "Home Subscriber Server" (HSS) and "Subscriber Locator Function" (SLF) and introduces a new element "Bootstrapping Server Function" (BSF) that implements key management functionality.

3GPP has further developed an evolved GBA infrastructure, "Generic Authentication Architecture" (GAA) extending the scope of GBA to include additional authentication procedures between the end user and applications (3GPP TR 33.919 Generic Authentication Architecture). Operators have emphasized a structure wherein GBA/GAA is deployed through an http-proxy. TS 33.222 specifies an Authentication Proxy, (AP), which is defined as a reverse http-proxy operating as a NAF entity for the UE on behalf of one or more Application Servers. The use of an authentication proxy, AP, is advantageous, e.g. providing:

Reduced Authentication Vector (AV) consumption and synchronization failures

Relief of Application Servers (AS) from performing security tasks (AP handles TLS protocol for secure transport and user authentication towards UE)

Application servers' perception of SSO.

Insofar as the GBA infrastructure offers convenient access to internal services, there are a growing number of services offered through public networks such as the Internet. This type of services will be referred to as external services.

In order to leverage trust relationships in a public network the Liberty Alliance Consortium has developed an infrastructure, Liberty Alliance Identity Federation Framework (ID-FF), offering single sign-on (SSO) and session management. Basically, a user should need to authenticate only once with any one service provider (SP) within a network of federated providers. An Identity Provider (IdP) maintains information about all service providers being members of the federation. IdP, on request from a user identified by means of a pseudonym, asserts that the user has authenticated with a specified SP. The SP being accessed verifies the assertion and allows the service access.

The Liberty Alliance consortium is committed to developing an open standard for federated network identity offering businesses, governments, employees, and consumers a more convenient and secure way to control identity information. It is a key component in driving the use of e-commerce and personalized data services, as well as Web-based services.

The ID-FF framework attracts great interest from mobile operators in the business role as Identity Provider IdP. Mobile operators, therefore, implement SSO using standard protocols to ease interoperability with external Service Providers SP.

In one scenario mobile operators provides WAP access to external services. For this, Liberty has introduced an entity called "Liberty-Enabled Proxy" (LEP), placed in the Identity Provider domain, and typically running inside a WAP gateway or HTTP proxy.

The specification "Liberty ID-FF Bindings and Profiles" (http://www.projectliberty.org/specs/draft-liberty-idff-bindings-profiles-1.2-errata-v2.0.pdf) defines the bindings and profiles of the Liberty protocols and messages to HTTP-based communication frameworks. Further, the specification "Liberty ID-FF Protocols and Schema" (http://www-.projectliberty.org/specs/draft-liberty-idff-protocols-schema-1.2-errata-v3.0.pdf) defines a core set of protocols that collectively provide a solution for identity federation management, cross-domain authentication, and session management.

Liberty request-response protocol elements are enclosed within a message body according to protocol "Simple Object Access Protocol" (SOAP). SOAP is a lightweight protocol for exchange of information in a decentralized, distributed environment developed by the World Wide Web Consortium, W3C (http://www.w3.org/TR/SOAP).

Operators are required to support both infrastructures, GBA/GAA and Liberty ID-FF SSO. In order to leverage inter work between these two infrastructures 3GPP TR 33.980 studies possible inter-working methods. There is a need to improve inter-working methods between the two infrastructures in order to reduce complexity and cost of implementation.

SUMMARY

A first embodiment of the invention discloses a convergent inter-working arrangement between a "Federated Single Sign On" infrastructure (FSSO), e.g. Liberty ID-FF, and an "Authentication/Bootstrapping Architecture" (AA/BA), e.g. 3GPP GAA/GBA infrastructure that provides improved reutilization of procedures, parameters and infrastructure components.

The invention comprises an "Integrated Authentication Proxy" (IAP) that combines the role of an AA/BA authentication proxy AP, e.g. a 3GPP GAA/GBA authentication proxy, and a FSSO enabled proxy, e.g. a "Liberty Enabled Proxy" (LEP). The proxy IAP intercepts a user UE request for access to a service and is characterised by having capability to determine if a user is attempting access to an external service at a FSSO enabled service provider SP, e.g. a Liberty-enabled service provider, or to an internal application within the domain of the proxy server. Depending on the type of access the proxy IAP is set in a corresponding operating state. Furthermore, the proxy IAP can determine type of authentication method to use in the AA/BA architecture, e.g. 3GPP GBA authentication based on AKA, public key infrastructure authentication (PKI), authentication based on biometric method, or strong authentication.

A method is disclosed wherein, in a first phase, the proxy IAP is initially set in a state to act as an AA/BA authentication proxy, e.g. a GAA/GBA authentication proxy. The IAP proxy, intercepting a user request for service access, may request the user to initiate an AA/BA authentication and bootstrapping, e.g. a GAA/GBA authentication and bootstrapping, with a bootstrapping server function BSF. Bootstrapping is only required if no previous bootstrapping information is available or if it is outdated.

The IAP proxy determines, exemplary from metadata associated with the request, which bootstrapping method to use, e.g. GBA bootstrapping, PKI based bootstrapping, bootstrapping based on biometric authentication or strong authentication. The bootstrapping process generates a temporary identity "Bootstrapping Transaction Identifier" (B_TID) that comprises a reference to generated keying material (Ks). The reference B_TID is provided to the user entity UE that is capable of calculating the same key Ks.

The request for service continues by the user equipment UE providing B_TID to the proxy IAP which may request, using B_TID, a session key from BSF derived from the key Ks. Based on the session key, which may also be calculated by UE, IAP authenticates the user UE. This is the only authentication on application level needed according to the invention.

This finishes the first phase of the service access according to the invention. In particular it is noticed that the IAP proxy integrates federated single sign on FSSO and authentication/bootstrapping functionalities AA/BA.

In an alternative embodiment, the IAP proxy forwards the request for service access to the BSF for direct initiation of bootstrapping.

According to the invention, the BSF functionality is implemented in a "Bootstrapping Identity Authentication and Session Management infrastructure" (BIAS) further implementing HSS functionality and a standard BSF/HSS interface, however, wherein the standard "Generic User Security Setting" (GUSS) is extended to include additional information, preferably a relation of user federated pseudonyms at different service providers SP. The result after the authentication proxy IAP has executed AA/BA procedures is:

A set of security keys is shared by the user equipment UE and the integrated authentication proxy IAP.

The user UE has been authenticated by the integrated authentication proxy IAP.

BSF in BIAS has downloaded an enhanced GUSS, including the list of available user Federated pseudonyms.

IAP holds an additional user identifier derived during the bootstrapping procedure, i.e. the identifier B-TID.

A second phase of the service access is initiated by IAP, utilizing a feature of the invention, determining type of service access. If the request concerns access to an internal application no further authentication required and the user is allowed access to the service provider SP. Otherwise, if the request concerns an external FSSO enabled application, e.g. Liberty enabled, the proxy IAP is set in FSSO enabled state and the corresponding authentication procedure is initiated. Which is the case may be determined from metadata associated with the user request for service access. In the FSSO case, IAP forwards the request for access to the service node SP which returns a request for authentication. The IAP proxy determines an identity provider IdP and provides the temporary identity B_TID. IdP checks with BSF validity of B_TID and, if validity is confirmed, retrieves the GUSS referenced by B_TID from HSS. IdP checks the federated pseudonyms associated with the service being accessed and generates assertion that the user is authenticated for access to the service. If no federated pseudonym exists for the service being accessed the authentication request may indicate that federation shall be performed. If that is the case IdP generates a new pseudonym for the service and stores the new pseudonym in GUSS.

The assertion is, thereafter, returned to the IAP proxy that forwards the assertion to the service provider SP. The service provider, confirming the assertion, responds to the integrated proxy IAP which, thereafter, acts in the path between the user and the service.

This finishes the second phase of the service access. Characteristic features of this phase comprise IAP determining type of service access, changing state of operation, and use of reference B_TID as a temporary user identity to retrieve authentication information.

According to a second embodiment the first phase is performed in a context of IMS and FSSO thereby integrating these infrastructures. More specific, in this embodiment there is no explicit support for an AA/BA infrastructure, e.g. GBA/GAA, but equivalent functions are integrated in an extension of IMS. In particular, the S-CSCF node of IMS is modified to include functions corresponding to BSF for generation of key Ks and reference B_TID. In a first phase an ordinary IMS registration and IMS authentication takes place. The first phase continues with a bootstrapping, e.g. according to GBA method, and authentication with the IAP server that, exemplary, may be co-located with the P-CSCF functionality of IMS-system. A second phase is thereafter initiated that is identical to the previously described second phase of the first embodiment.

The invention further comprises a Bootstrapping, Identity, Authentication and Session management entity, BIAS that efficiently combines features from GAA/GBA, Liberty ID-FF and existing HSS and GBA User Security Settings, GUSS. Notably, then, the S-CSCF functionality is modified to include functionality for generation and management of key Ks and identity B_TID.

DETAILED DESCRIPTION

Figure 1:
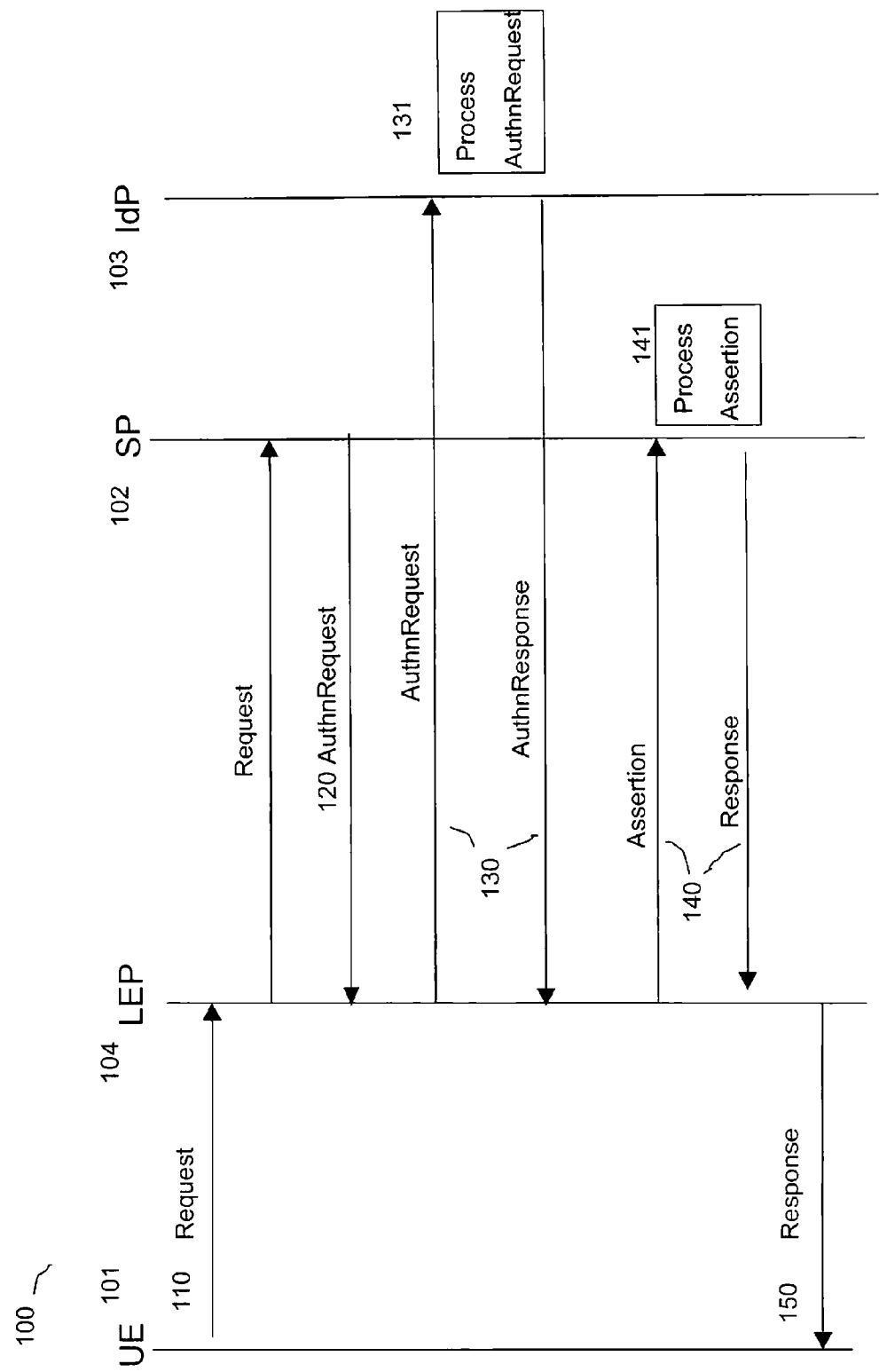
FIG. 1 shows overview signalling in prior art single sign on system using Liberty enabled proxy.

FIG. 1 shows an overview of signalling according to the Liberty ID-FF framework. At 110 a user entity 101 UE makes a request for service at a service provider 102 SP, the request passing through a liberty enabled proxy 104 LEP. SP requests authentication at 120. At 130 an authentication request-response communication is shown with the identity provider 103 IdP that processes the authentication request at 131. The authentication response includes an assertion that UE is authenticated. At 140 communication of assertion is made with the service provider SP that processes the assertion at 141. At 150 the proxy LEP responds to the request 110 that UE is authenticated for access to services at SP.

Figure 2:
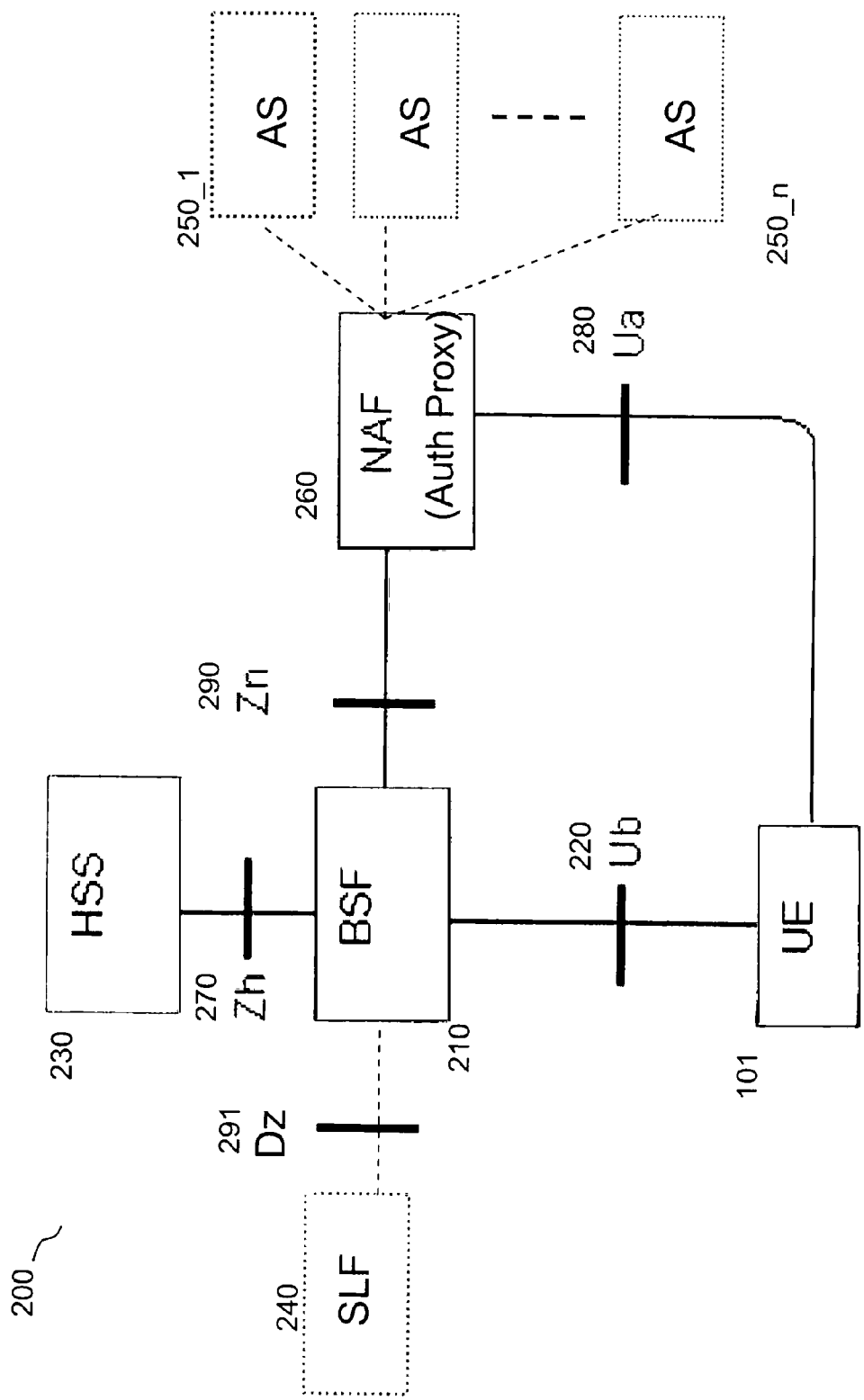
FIG. 2 shows the basic components of GBA/GAA infrastructure.

FIG. 2 illustrates prior art deployment of GBA/GAA through an authentication proxy 260 acting as a Network Application Function NAF against the GBA/GAA infrastructure. A generic Bootstrapping Server Function 210 BSF and a User Entity 101 UE mutually authenticates using the AKA protocol. UE communicates with BSF over an interface 220 Ub. UE and a Home Subscriber System 230 (HSS) shares a key that is basis for HSS to generate authentication vector provided to BSF over interface 270 Zh. According to the AKA protocol, BSF sends to UE a challenge and UE returns a response to BSF. Authentication is verified by BSF comparing the UE response with an expected response as provided by HSS. Successful authentication initiates at BSF and UE generation of a shared key Ks. BSF stores the key Ks and associated reference B_TID. The reference B_TID and other data, such as a key lifetime, are thereafter provided to UE in a completion message. A Subscriber Locator Function 240 SLF is queried by the BSF over interface 291 Dz in conjunction with the Zh interface operation to get the name of the HSS containing the required subscriber specific data. UE may connect simultaneously to at least one Application Server 250_n AS through a Network Application Function authentication proxy NAF 260. The connection comprises a first step of authentication between UE and NAF. Thereby, UE provides the reference B_TID to NAF that, using B_TID, requests a key (Ks_NAF) from BSF over interface 290 Zn. The key Ks_NAF is derived from the key Ks. The same key may be derived at UE. Authentication is thereafter, made based on the derived key Ks_NAF. The communication between UE and NAF is over an interface 280 Ua.

The prior art infrastructures according to FIGS. 1 and 2 are thus adapted to the particular type of access, i.e. Liberty type of access respectively GBA NAF-type of access.

Figure 3:
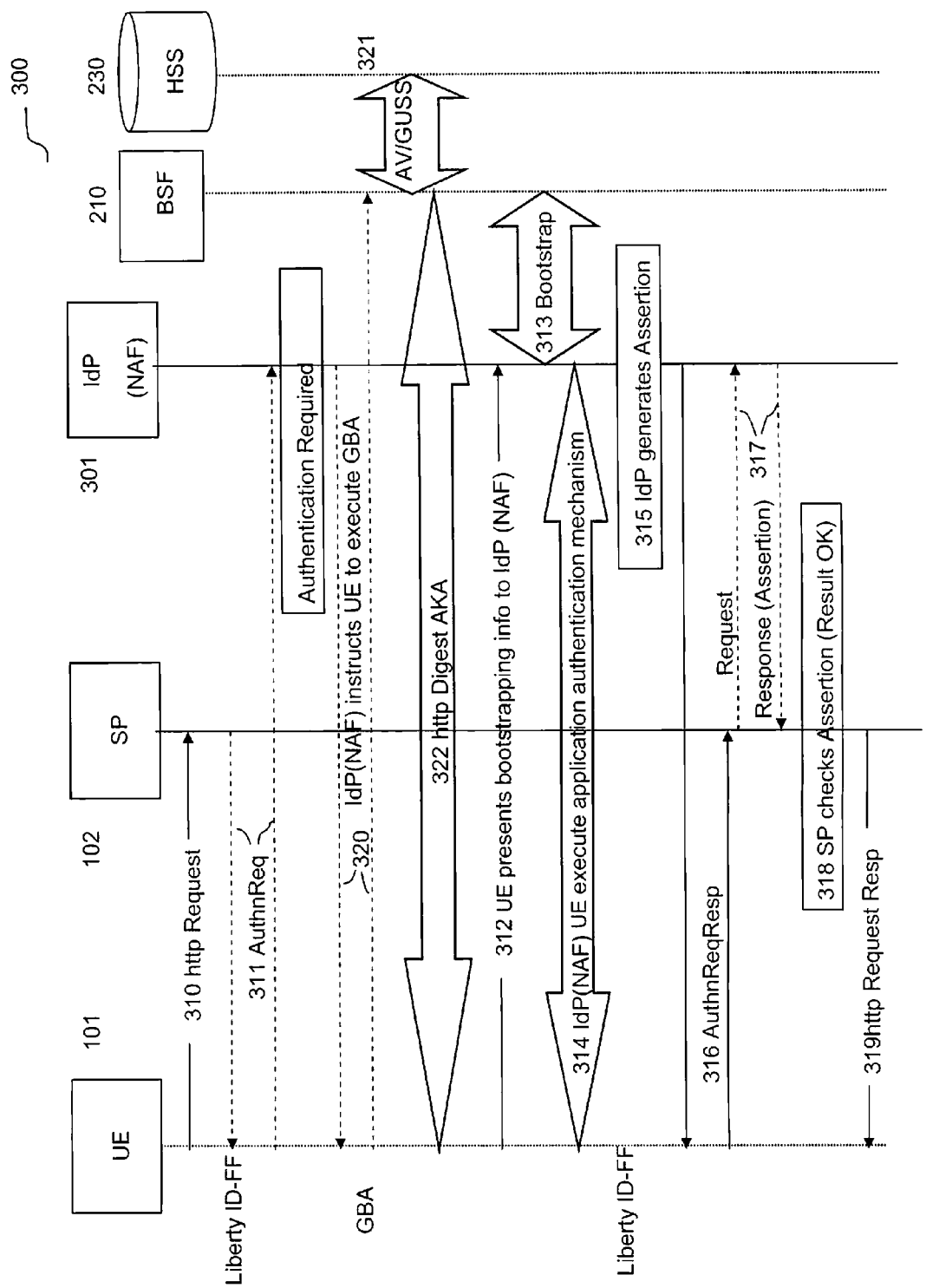
FIG. 3 shows prior art exemplary arrangement for integration of Liberty single sign on infrastructure and GBA/GAA infrastructure.

3GPP TR 33.980 studies the details of possible inter-working methods between Liberty ID-FF and GBA/GAA as shown in FIG. 3. FIG. 3 shows how the 301 IdP in the Liberty infrastructure additionally behaves as a NAF in the GBA/GAA world in order to authenticate the user using GBA procedures. At 310 a user 101 UE makes a request for access to service provider 102 SP, e.g. an http-request. The service provider SP responds with a request for authentication whereupon UE contacts 301 IdP(NAF) to initiate authentication. These steps are shown at 311 in FIG. 3. IdP(NAF) determines that authentication is required and requests UE to initiate at 210 BSF a GBA phase including GBA bootstrapping. These steps are shown at 320 in FIG. 3. It is noticed that IdP/NAF only needs to initiate a bootstrapping procedure in case no bootstrapping information is included in the Authentication request 311 or the bootstrapping information provided is not fresh. However, according to 3GPP TR 33.980 IdP/NAF appears to request bootstrapping and authentication of the user based on the bootstrapped material every time a Liberty Authentication Request 311 is made. The inventive solution does not suffer from this drawback.

At 321 BSF requests authentication vectors AV and GBA User Security Setting GUSS from the Home Subscriber Server HSS. At 322 BSF authenticates UE e.g. according to http digest AKA. In this step UE, furthermore, receives bootstrapping information from BSF. Thereafter the Liberty process continues and, at 312, UE presents bootstrapping information to IdP(NAF) in order to be authenticated. IdP(NAF) requests at 313 bootstrap information from BSF. At 314 IdP (NAF) and UE execute an authentication mechanism. IdP generates at 315 assertion that UE has been authenticated and sends the assertion to UE. At 316, UE requests to be authenticated by the service provider 102 SP whereupon SP requests assertion of authentication of the user UE from IdP. This is shown at 317 in FIG. 3. SP checks the assertion at 318 and responds at 319 to the initial request 310.

According to prior art FIG. 3, Liberty ID-FF and GAA infrastructures inter-work by allowing Liberty IdP to use GAA infrastructure to authenticate end-users. The inter-working is achieved by deploying full Liberty ID-fiti and 3GPP GBA infrastructures, and implementing specific adaptations so as to enable a Liberty IdP to link a 3GPP GAA end-user authentication process. A disadvantage of prior art FIG. 3 for inter-working between GBA/GAA and ID-FF is an increased computational load due to the requirement of a complete implementation of both these infrastructures and additional adaptations to allow for the inter-work to take place. Thus, prior art arrangement FIG. 3 results in extra costs and system complexity.

In summary, major disadvantages of prior art FIG. 3 for inter-work between GBA/GAA and ID-FF are:
Duplicated underlying functionality. Full infrastructures are deployed for GBA/GAA and ID-FF vertically, even if IdP/NAF is co-located with BSF.
Duplicated authentication. The BSF authenticates once for bootstrapping (step 311) and IdP/NAF authenticates once more (step 314), which is not efficient when the operator implements both IdP and GBA/GAA infrastructures.
Duplicated sessions. The IdP and BSF both keep authentication sessions, where much of the session information is common to both, e.g. key lifetime.

Figure 4:
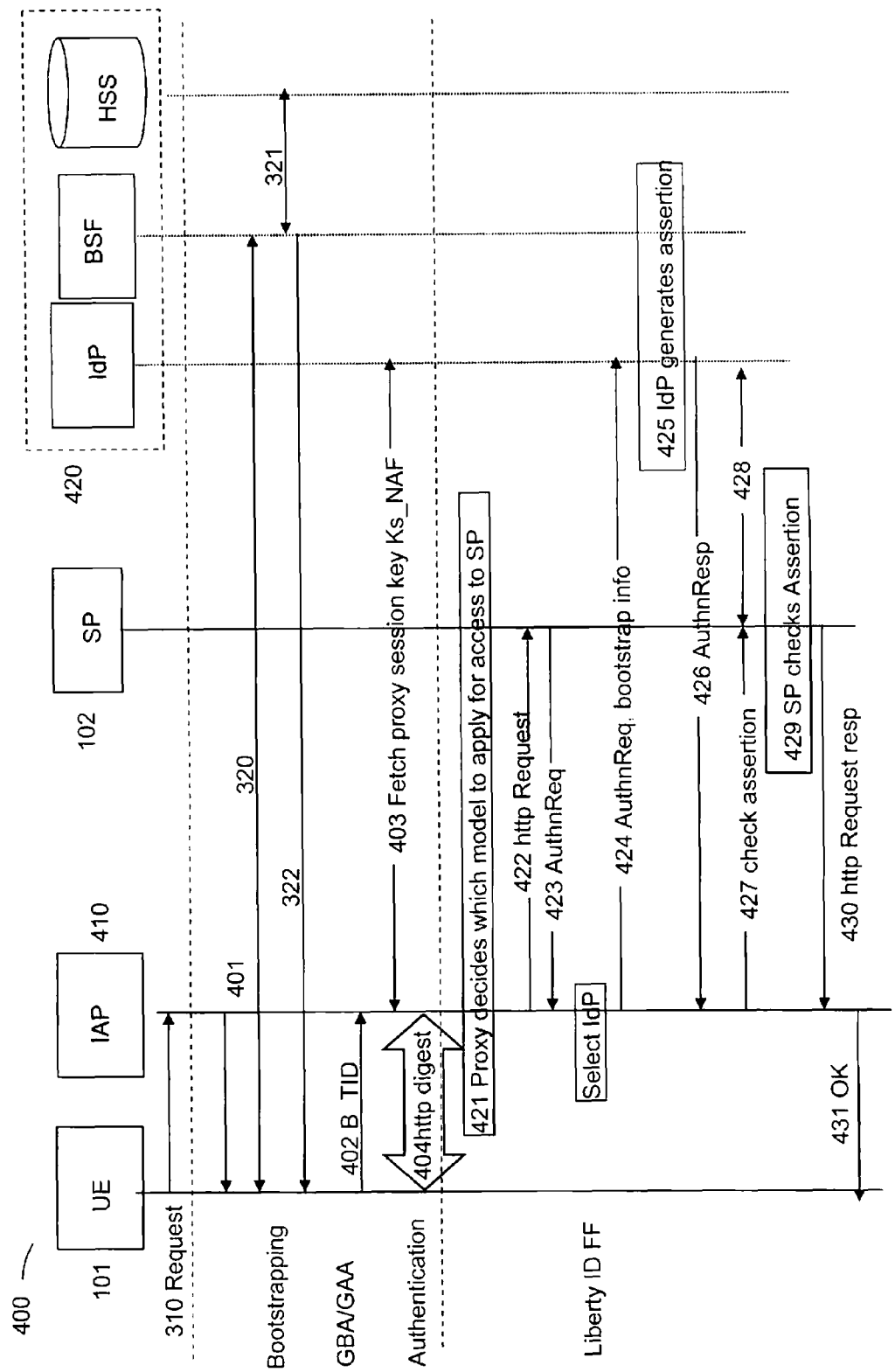
FIG. 4 shows an embodiment of the invention.

FIG. 4 illustrates a first embodiment of the invention. FIG. 4 may be compared with FIG. 3, however in FIG. 4 a novel Integrated Authentication Proxy server 410 IAP is inserted in the path between user equipment, UE, and service provider 102 SP. Like reference numerals correspond to like entities in FIG. 3 and FIG. 4.

The proxy 410 implements LEP/AP functionality as well as new functionality further described below. At 420 there is shown converged Bootstrapping Identity Authentication and Session Management infrastructure BIAS that comprises three fundamental components: IdP, BSF, and HSS. The components can communicate using system internal communication links The proxy 410 and the infrastructure BIAS are assumed to belong to the same operator domain. In the following we shall assume for simplicity that federated single sign on is according to Liberty alliance ID-FF framework and that authentication and bootstrapping is according to the GBA standard. However, this is an exemplary limitation and the invention is applicable with any general federated single sign on FSSO and authentication/bootstrapping infrastructure AA/BA.

At 310 user entity UE transmits a request for access to a specific service provider, SP. The request may exemplary be a HTTP request. At this point, the invention departs from prior art FIG. 3 and the request is intercepted by the proxy 410, which initially acts as a 3GPP-GAA/GBA Authentication Proxy AP with NAF functionality that is subsequently used to authenticate the user.

At 401 the proxy requests UE to execute GBA/GAA bootstrapping if there is no previous valid bootstrapping material available. If required, UE executes at 320 the standard procedure specified in TS 33.222 and the steps 321 and 322 are executed. As in corresponding step 321 in FIG. 3, step 321 in FIG. 4 comprises BSF obtaining from HSS a GBA user security setting, GUSS, however, according to the invention, extended with a list of current federated user pseudonyms.

In an alternative arrangement of the bootstrapping initiation signal 320 the proxy server 410 intercepts all signalling from UE and is configured to transparently forward signals directed to BSF.

In another alternative arrangement of the signal 320, UE is configured to communicate directly with BSF bypassing the proxy server 410.

According to 3GPP TS 33.220 Generic Bootstrapping Architecture, GBA, a bootstrapping transaction identifier B_TID is generated and forwarded in step 322 to UE. The identifier B_TID is not permanent but may change e.g. at re-authentication. However, the identifier B_TID is associated in BSF with a permanent identity of UE, e.g. International Mobile Subscriber Identity (IMSI) or a private user identity (IMPI).

At 402 the identifier B_TID is provided to the proxy server 410 that, according to the invention, further has NAF functionality. Following the generic bootstrapping architecture 3GPP TS 33.220 the proxy server 410 obtains at 403 a session key Ks_NAF from BSF and authenticates UE at step 404, e.g. using http digest protocol.

At this point it is reminded that the proxy server 410 only initially is set to act as a 3GPP-GAA/GBA Authentication Proxy and as long as the UE provides valid bootstrapping information to the IAP in 310, the bootstrapping 320 and authentication 404 need not be executed. The process then proceeds directly to step 421.

In step 421, the proxy 410 decides which model to apply for access to SP. If SP represents an internal service node within the same operator domain as the proxy 410 and BIAS 420, then SP may accept the authentication by proxy server 410 in step 404 and allow UE access to services without further authentication.

If, however, SP represents an external service in public domain the proxy server 410 initiates a Liberty sign on and sends a request at 422 to SP, e.g. an http request including a liberty enabled header (LEH) indicating to SP that the proxy is liberty enabled.

According to an alternative embodiment of the invention, the proxy server 410 has access to an operator defined directory of internal and external service providers SP for determining which model to apply for the service access. The information related to an external service provider may include a corresponding service level agreement, (SLA).

Upon reception of the request 422, the SP initiates a Liberty ID-FF authentication request procedure exemplary using profile information provided in the header LEH.

In response to receiving a request for authentication at 423, the proxy 410 selects an identity provider IdP which, according to the invention, is integrated in the BIAS infrastructure 420. The message 423 has the form of an envelope that, besides the request, further includes, e.g., the identity SP-ID of the service provider 413. At 424 the request, extracted from the envelop message, is forwarded to the IdP functionality at BIAS infrastructure 420, e.g. in a SOAP message.

The signal 424 may include the identifier B-TID e.g. as an http-header or a URL parameter. This is a key aspect of the invention whereby GBA related information is reused in the liberty domain in this case as a means for user identification and session management at the BIAS IdP functionality. The identifier B-TID may be used by the BIAS (IdP) in order to check authentication status of the user.

Alternatively, IdP may base user identification on other identities provided in the signal 424, e.g. user MSISDN number, IP address, or forwarding a cookie exemplary previously set by BIAS 420 at initial bootstrapping in steps 320, 322.

At 425 BIAS generates assertion of user pseudonym. In particular, IdP may use the identifier B_TID to request the BSF-functionality of BIAS to retrieve a user pseudonym, e.g. IMPI. Recall from step 321 that HSS provides BSF with a list of federated user pseudonyms. The fact that a valid identifier B_TID is available at BSF-functionality is sufficient for BSF to determine that the user has been authenticated.

In response to the authentication request message 424, IdP at 426 returns an authentication response message including assertion of user identity or artefact e.g. according to the OASIS (lattp://www.oasis-open.org/home/index.php) standard "Security Assertion Markup Language" SAML. The message 426 has form of redirect message and the proxy server 410, at reception of signal 426, performs redirection at 427 to SP of the assertion or artefact. The messages 424, 426, and 427 may use HTTP GET, POST, or WML browser.

At step 429, the service provider SP checks the assertion. If the message 427 includes an artefact, SP may request verification of assertion from IdP in additional communication, exemplary exchanging SOAP messages 428 with IdP for requesting and verifying assertion of identity.

At 430, the proxy server 410 receives verification of user authentication e.g. a HTTP Request Response message thereby completing the original request 422. Finally, message 431 completes the original request 310.

Figure 5:
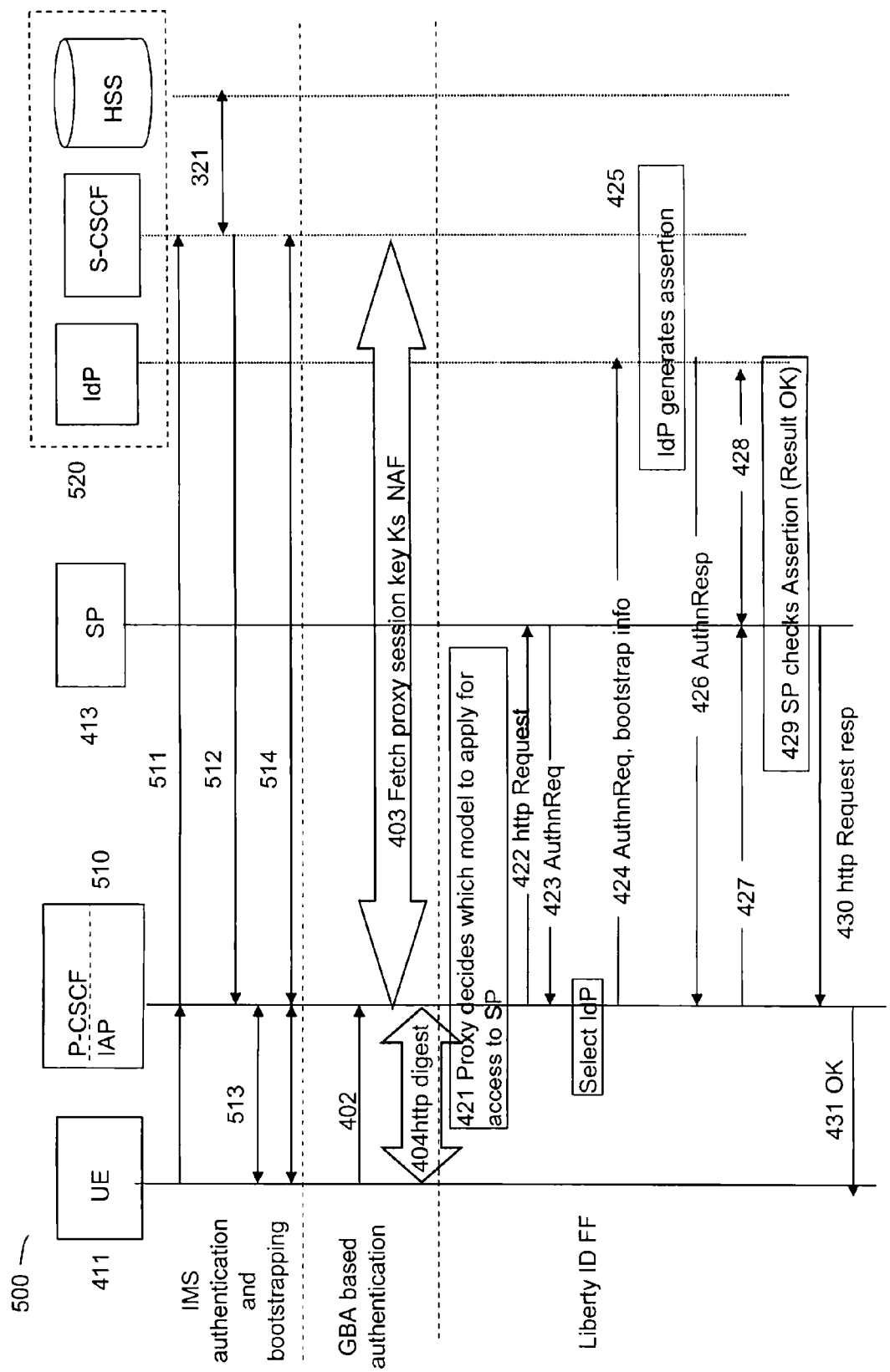
FIG. 5 shows another embodiment of the invention.

According to a second embodiment the invention is implemented in an IMS infrastructure illustrated in FIG. 5. In FIGS. 5 and 4 like numerals denote same entities.

In IMS architecture, the proxy server 410 is assumed to reside close to the P-CSCF 510 and therefore they may be integrated as indicated in FIG. 5. This is, however, not necessary for this arrangement to work.

A first IMS authentication and bootstrapping phase is initiated by a SIP register message 511 to the P-CSCF function and further forwarded to the S-CSCF implemented, according to the embodiment, at BIAS 520. The registration message may include a user identity, e.g. a public user identity IMPU. At 321 authentication vectors are requested from HSS. The signaling exchange at 512, 513 comprises standard signaling for performing AKA authentication of the user UE. GBA bootstrapping is indicated at step 514. In this step a bootstrapped key Ks is formed together with a reference B_TID and stored at BIAS together with a public user identity IMPU. As is well known from the GBA method, this step includes providing the reference B_TID to the user UE. It can be seen that, the BIAS 520 differs from BIAS 420 in that BSF is not implemented whereas certain BSF functions are here incorporated in S-CSCF preferably for creation of key Ks and reference B_TID.

In a second phase, the user initiates a service request at 402 including the reference B_TID. The service request may further include an identity SP_ID of the desired service provider SP. The request is intercepted by proxy IAP as previously described and steps 403, 404 are executed wherein the user authenticates to the proxy server 510 using GBA method, however, noticing that S-CSCF takes the role of BSF. The remaining steps are identical to those described in relation to FIG. 4.

In alternative embodiments, the GAA/GBA method is replaced by any other authentication and bootstrapping architecture AA/BA that provides a bootstrap key Ks and associated reference B_TID. In particular, authentication may exemplary be based on the AKA standard, a public key infrastructure, a biometric method, or a strong authentication method. The method used in a particular case may be determined from metadata associated with a service request, e.g service request 310.

Further, according to an alternative embodiment, any federated single sign on FSSO architecture is used that generates assertion of identity.

Figure 6:
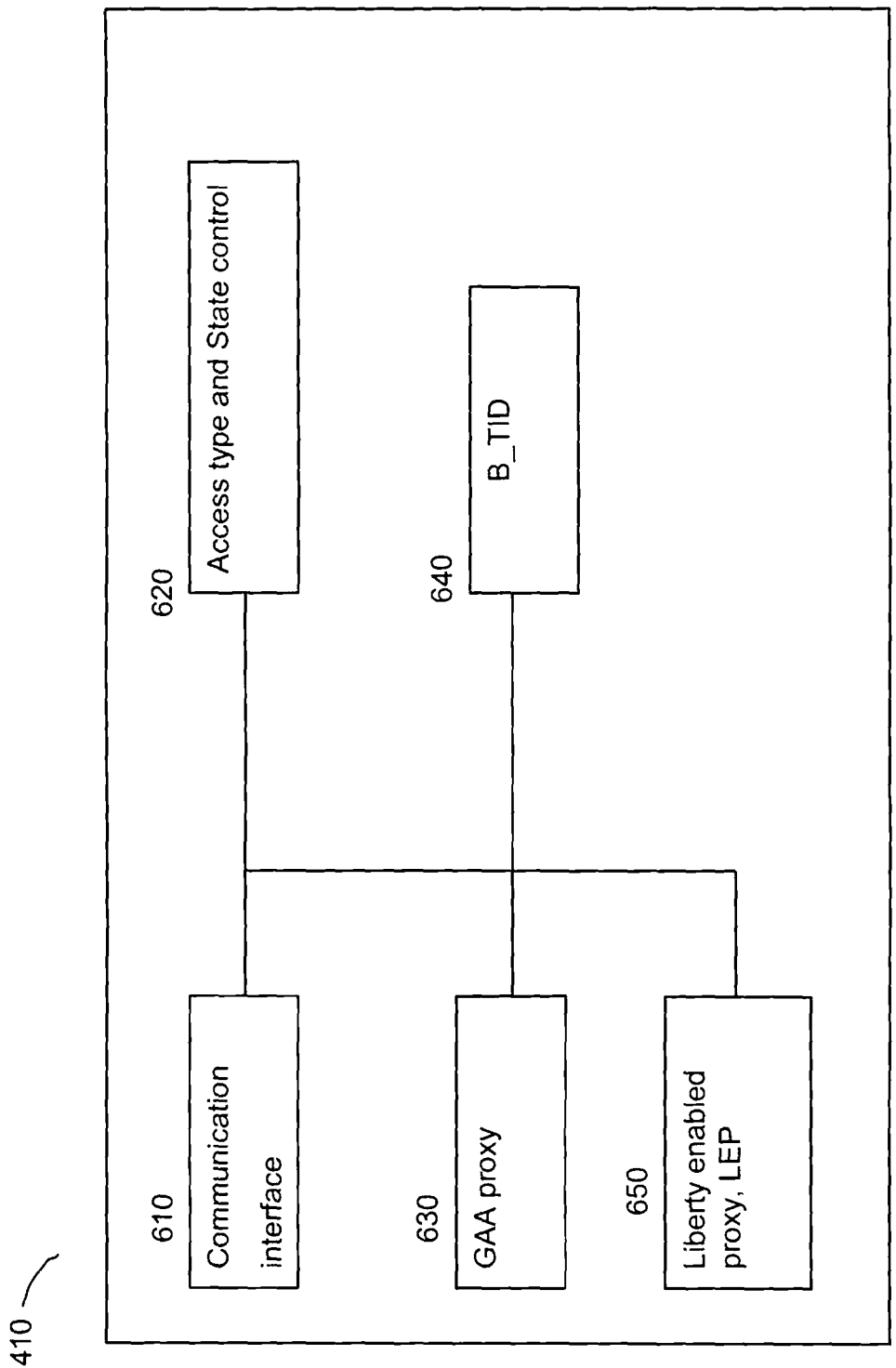
FIG. 6 illustrates an exemplary arrangement of an integrated authentication proxy according to the invention.

FIG. 6 illustrates schematically an exemplary arrangement of the inventive integrated authentication proxy server 410 adapted for the infrastructures GAA/GBA and Liberty ID-FF. FIG. 6 shows means for communication 610 by which the proxy 410 server can communicate with other network entities. The proxy server 410 integrates means 630 and 650 for processing GAA/GBA formatted requests respectively Liberty formatted requests. Access type and state control means 620 determines type of service request received at the communication means 610 and sets the proxy 410 in a corresponding state. Storage means 640 stores e.g. the reference B_TID.

It is readily understood that the means for processing GAA/GBA and Liberty ID-FF formatted requests may be replaced by means adapted to any other frameworks AA/BA respectively FSSO as discussed above.

While the invention has been described with reference to specific exemplary embodiments, the description is in general only intended to illustrate the inventive concept and should not be taken as limiting the scope of the invention. The present invention is defined by the appended claims.

The invention claimed is:

1. A method for authenticating a user equipment (UE), operative in a domain of telecommunication providing support for a federated single sign on infrastructure (FSSO) and an authentication and bootstrapping infrastructure (AA/BA), for access to service provider (SP) comprising:
   in the domain of telecommunication an integrated proxy (IAP), initially set in a state to support AA/BA infrastructure, intercepting a service request by UE thereby initiating bootstrapping at a Bootstrapping Identity Authentication and Session Infrastructure (BIAS) according to the AA/BA infrastructure whereby UE and BIAS generates at least a shared key Ks and associated temporary identity B_TID and whereby further BIAS provides UE with B_TID;
   UE providing B_TID to the integrated proxy IAP for authentication according to the AA/BA architecture;
   the integrated proxy IAP, in response to determining if the service provider SP is external to the domain of telecommunication changes state to act as a FSSO-proxy;
   the integrated proxy IAP acting as an intermediary between UE and SP whereby, if the SP is within the domain of telecommunication, SP accepts said authentication for service access and whereby, if SP is external, SP requests the integrated proxy IAP to initiate authentication according to the FSSO-architecture.

2. The method of claim 1 wherein the step of initiating bootstrapping comprises proxy IAP requesting user equipment UE to make said initiation.

3. The method of claim 1 wherein the integrated proxy IAP transparently forwards messages from UE if directed to BIAS.

4. The method of claim 2 wherein, in the step of IAP requesting user equipment UE to initiate bootstrapping, UE accesses BIAS directly without being intercepted by IAP.

5. The method of claim 1 wherein support for the FSSO-infrastructure is implemented in BIAS and in that the authentication according to FSSO comprises the further steps:
   the integrated proxy (IAP) making a request to BIAS to assert authentication of user equipment (UE) identified by temporary identity (B_TID), the request at least including an identity of service provider (SP_ID);
   the infrastructure BIAS, using reference B_TID, retrieving a private user identity (IMPI) and registered federated pseudonyms associated with the pair IMPI-SP_ID and returning assertion of at least a pseudonym being authenticated to IAP that forwards the assertion to the service provider SP.

6. The method of claim wherein the service request includes a valid reference B_TID whereby proxy IAP directly performs the step of authentication.

7. The method of claim 1 wherein the step determining is in dependence of service provider SP related data retrieved from a domain specific directory of service providers.

8. The method of claim 5 wherein BIAS, in response to determining, in the step of retrieving federated pseudonyms, that no federated user pseudonym exists for the pair IMPI-SP_ID, creates a pseudonym for registration.

9. The method of claim 1 wherein the federated single sign-on is performed according to the Liberty Alliance Identity Federation Framework (ID_FF) standard.

10. The method of claim 1 wherein the federated single sign-on is performed according to the OASIS Security Assertion Markup Language (SAML) standard.

11. The method of claim 1 wherein the AA/BA architecture is implemented according to the Generic Bootstrapping Architecture/Generic Authentication Architecture (GBA/GAA) standard.

12. The method of claim 5 wherein the request includes the user Mobile Subscriber Integrated Services Digital Network (MSISDN) or user IP address or user URL.

13. The method of claim 5 wherein the infrastructure BIAS integrates functions Identity Provider (IdP), Bootstrapping Server Function (BSF), Authentication, Authorization, and Accounting (AAA), and Home Subscriber Server (HSS).

14. The method of claim 13 wherein request includes a cookie previously set by the function IdP.

15. The method of claim 13 wherein the retrieving of federated user pseudonyms comprises the function BSF receiving federated pseudonyms from the function HSS in an extended generic user security setting Generic User Security Setting (GUSS) record and in that the assertion of at least a pseudonym is performed by the function BSF.

16. The method of claim 2 wherein said domain supports IP Multimedia Subsystem (IMS) infrastructure and the integrated proxy server (IAP) further has IMS Proxy Call Session Control Function (P-CSCF) functionality and BIAS implements Serving Call Session Control Function (S-CSCF) functionality, wherein said initiation of bootstrapping comprises user equipment (UE) to direct a IMS Session Initiation Protocol (SIP) registration to S-CSCF functionality of BIAS, the registration being intercepted by P-CSCE functionality of proxy IAP.

17. The method of claim 16 wherein the generation of key Ks at BIAS is made at the S-CSCE functionality implemented therein.

18. An integrated proxy (IAP), in a domain of telecommunication providing support for a federated single sign on infrastructure (FSSO) and an authentication and bootstrapping infrastructure (AA/BA) for authenticating access to service provider (SP) comprising:
   means for implementing a AA/BA authentication and proxy functionality;
   means for implementing support for a federated single sign on infrastructure FSSO;
   means for communication in the domain of telecommunication;
   means for determining type of user access and for setting the proxy IAP in an AA/BA or FSSO operating state.

19. The integrated proxy according to claim 18 wherein the federated single sign on infrastructure is a Liberty Alliance Identity Federation Framework (ID-FF) and in that proxy IAP is a Liberty Enabled Proxy (LEP).

20. The integrated proxy according to claim 18 wherein the federated single sign on infrastructure is an OASIS Security Assertion Markup Language (SAML) infrastructure and proxy IAP is a SAML Extended Proxy.

21. A Bootstrapping, Identity, Authentication and Session management infrastructure (BIAS) implemented in a telecommunications network having support for a federated single sign on infrastructure (FSSO) and an authentication and bootstrapping infrastructure (AA/BA), the infrastructure BIAS arranged to provide support for authentication of a user (UE) making access to a service provider (SP) comprising:
   means for storing user credentials and a generic user security setting (GUSS) including a list of federated user pseudonyms in the FSSO infrastructure;
   means for generating authentication information and for providing authentication information to network node for authentication of user UE;
   means for generating in the infrastructure AA/BA a shared key Ks and a reference B_TID to the shared key, B_TID representative of identity of user UE;
   means for receiving a reference B_TID in request for authentication message and for generation of an asserted user pseudonym associated with user identified by reference B_TID.

* * * * *

UNITED STATES PATENT AND TRADEMARK OFFICE
CERTIFICATE OF CORRECTION

PATENT NO. : 8,572,708 B2  
APPLICATION NO. : 12/521493  
DATED : October 29, 2013  
INVENTOR(S) : Barriga et al.

Page 1 of 1

It is certified that error appears in the above-identified patent and that said Letters Patent is hereby corrected as shown below:

In the Specification

Column 6, Line 20, delete "Liberty" and insert -- Liberty ID-FF --, therefor.

Column 7, Line 2, delete "links" and insert -- links. --, therefor.

Column 7, Line 60, delete "Liberty" and insert -- Liberty ID-FF --, therefor.

In the Claims

Column 10, Line 33, in Claim 6, delete "claim" and insert -- claim 1 --, therefor.

Column 10, Line 36, in Claim 7, delete "the step" and insert -- the step of --, therefor.

Signed and Sealed this  
Fifteenth Day of July, 2014

Michelle K. Lee  
*Deputy Director of the United States Patent and Trademark Office*